United States Patent
Custodero et al.

(10) Patent No.: US 8,313,109 B2
(45) Date of Patent: Nov. 20, 2012

(54) TIRE FOR PRIVATE PASSENGER AUTOMOBILE

(75) Inventors: Emmanuel Custodero, Chamalieres (FR); Jean-Marie Mus, Marsat (FR)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 94 days.

(21) Appl. No.: 12/670,308

(22) PCT Filed: Jul. 9, 2008

(86) PCT No.: PCT/EP2008/058929
§ 371 (c)(1), (2), (4) Date: Jun. 26, 2010

(87) PCT Pub. No.: WO2009/013134
PCT Pub. Date: Jan. 29, 2009

(65) Prior Publication Data
US 2010/0264610 A1    Oct. 21, 2010

(30) Foreign Application Priority Data
Jul. 23, 2007  (FR) .................................... 07 05398

(51) Int. Cl.
*B60G 3/26*    (2006.01)

(52) U.S. Cl. .................................................... 280/5.521
(58) Field of Classification Search ................. 280/5.52, 280/5.521; 152/151; 73/146, 146.2
See application file for complete search history.

(56) References Cited

U.S. PATENT DOCUMENTS

| | | | |
|---|---|---|---|
| 6,408,908 B1 | 6/2002 | Scarpitti | |
| 7,546,764 B2 * | 6/2009 | Morinaga et al. | 73/146 |
| 2004/0112492 A1 | 6/2004 | Kotanides | |

FOREIGN PATENT DOCUMENTS

| | | |
|---|---|---|
| EP | 0 391 300 | 10/1990 |
| EP | 1 207 056 | 5/2002 |
| EP | 1 564 029 | 8/2005 |

* cited by examiner

*Primary Examiner* — Faye M. Fleming
(74) *Attorney, Agent, or Firm* — Cozen O'Connor

(57) ABSTRACT

A tire for an axle of a private passenger vehicle having two axles. The axle comprises a suspension device for positively controlling the camber of the wheels relative to the ground in the case of transverse acceleration. The tire develops a contact patch on the ground, said contact patch having a length at the left shoulder ($L_eg$), a length at the right shoulder ($L_ed$) and a central length ($L_c$), a contact patch ratio ($R_{ep}$) being defined by the quotient of the average of the shoulder lengths divided by the central length. The tire contact patch ratio is greater than 0.65.

9 Claims, 2 Drawing Sheets

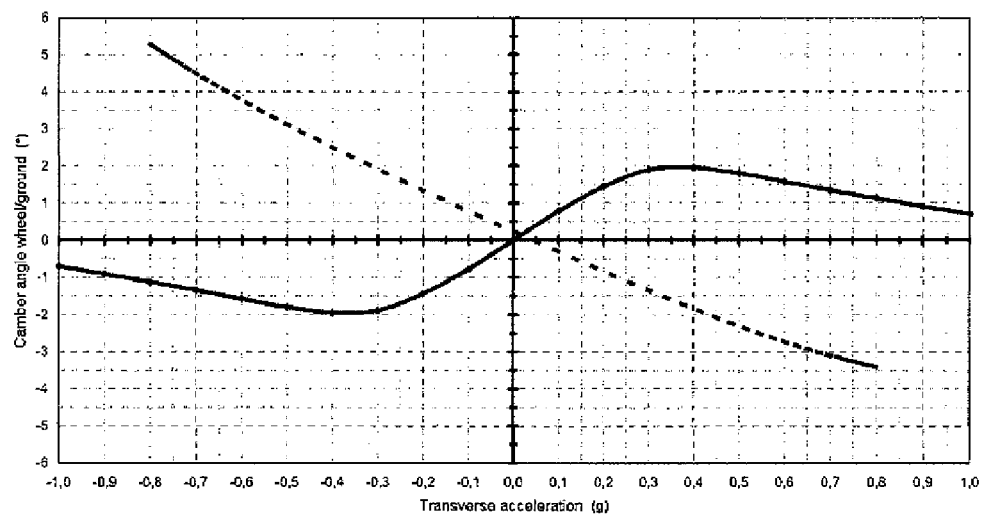
Fig. 3 Front axle
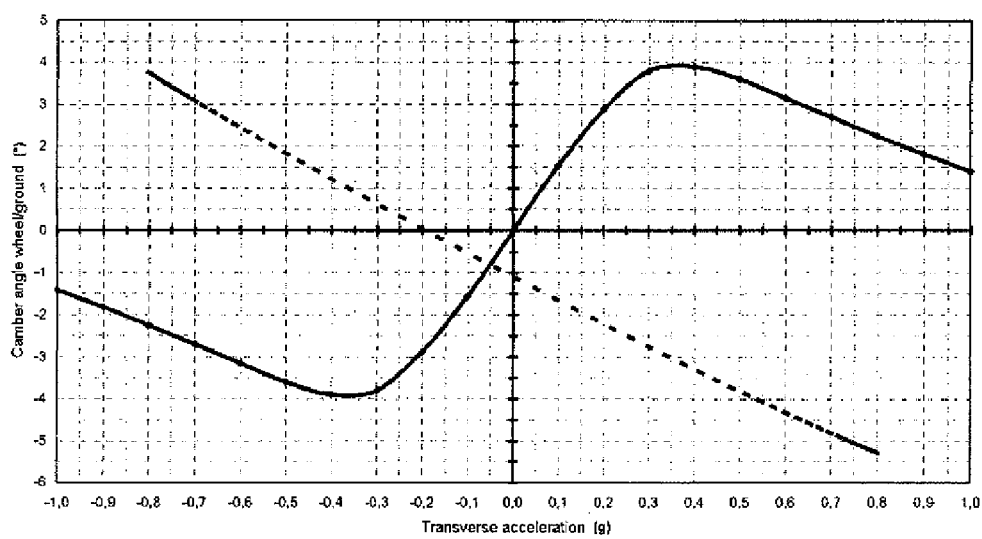
Fig. 4 Rear axle

US 8,313,109 B2

TIRE FOR PRIVATE PASSENGER AUTOMOBILE

RELATED APPLICATIONS

This is a U.S. national stage under 35 USC §371 of application No. PCT/EP2008/058929, filed on Jul. 9, 2008.

This application claims the priority of French application no. 07/05398 filed Jul. 23, 2007, the entire content of which is hereby incorporated by reference.

FIELD OF THE INVENTION

The invention relates to the contact with the ground of vehicles, in particular the contact with the ground of passenger vehicles.

BACKGROUND OF THE INVENTION

The essential component parts of the contact with the ground of vehicles are the tires and the suspension devices.

An essential role of the suspension devices is to guide the wheels of the vehicle in such a way that the tires work in the best possible conditions in order to derive the best possible advantage therefrom, whether from the point of view of the dynamic performance of the vehicle or safety or the high mileage capability of the tires.

Suspension devices have thus been proposed in order to guarantee improved control of the camber of the wheels with regard to transverse accelerations, for example by permitting total compensation for the effect of the rolling of the vehicle or even by permitting the inclination of the plane of the wheel towards the inside of the vehicle in corners. In the present application, the expression "for positively controlling the camber of the wheels relative to the ground in case of transverse acceleration" is used when the control has the effect of inclining the wheels towards the inside of the corners. Such suspension devices are described, for example, in documents EP 1070609, WO 2004/058521, EP 0979769 or EP 1752321. These devices may be active, that is to say they may utilize a supply of energy (of electric, hydraulic or other origin) in order to apply the variations in camber or, on the other hand, they may be passive, that is to say they may utilize only the mechanical energy associated with the movement of the vehicle (potential energy or kinetic energy).

These devices have actually permitted a significant improvement in vehicle performance. However, this improvement has not generated sufficient interest in the eyes of the manufacturers for them to compensate for the greater mechanical bulk of these devices. Until now, therefore, this has precluded the adoption of such suspension devices on passenger vehicles.

SUMMARY OF THE INVENTION

One object of the invention is to utilize a tire of a particular type in combination with such suspension devices with positive control of the camber to further improve the performance of the vehicle in a substantial manner.

One aspect of the invention relates to a tire for an axle of a private passenger vehicle having two axles, said axle comprising a suspension device for positively controlling the camber of the wheels relative to the ground in the case of transverse acceleration, said tire developing a contact patch on the ground, said contact patch having a length at the left shoulder, a length at the right shoulder and a central length, a contact patch ratio being defined by the quotient of the average of the shoulder lengths divided by the central length, wherein the contact patch ratio is greater than 0.65, and preferably greater than 0.70.

More preferably, the tread of the tire is composed of a rubber composition, of which the value of tan δ measured at −10° C. is greater than 0.85 and more preferably greater than 0.90.

Another aspect of the invention relates to a private passenger vehicle having two axles, in which at least one of the two axles comprises a suspension device for positively controlling the variations in the camber of the wheels relative to the ground in the case of transverse acceleration, said at least one axle being fitted with such tires.

Each of the two axles preferably comprises a suspension device for positively controlling the variations in the camber of the wheels relative to the ground in the case of transverse acceleration, the two axles being fitted with such tires.

Said suspension device is preferably a passive system.

The suspension device is preferably configured in such a way that the vehicle exhibits an average rate of variation of the camber as a function of transverse acceleration greater than 5°/g, and more preferably greater than 10°/g, between −0.3 g and 0.3 g of transverse acceleration.

BRIEF DESCRIPTION OF THE DRAWINGS

FIG. 3 is an example of a graph showing the variation of the camber of the front wheels of a vehicle according to an embodiment of the invention as a function of the transverse acceleration.

FIG. 4 is an example of a graph showing the variation of the camber of the rear wheels of a vehicle according to an embodiment of the invention as a function of the transverse acceleration.

DETAILED DESCRIPTION OF THE DRAWINGS

Figure 1:
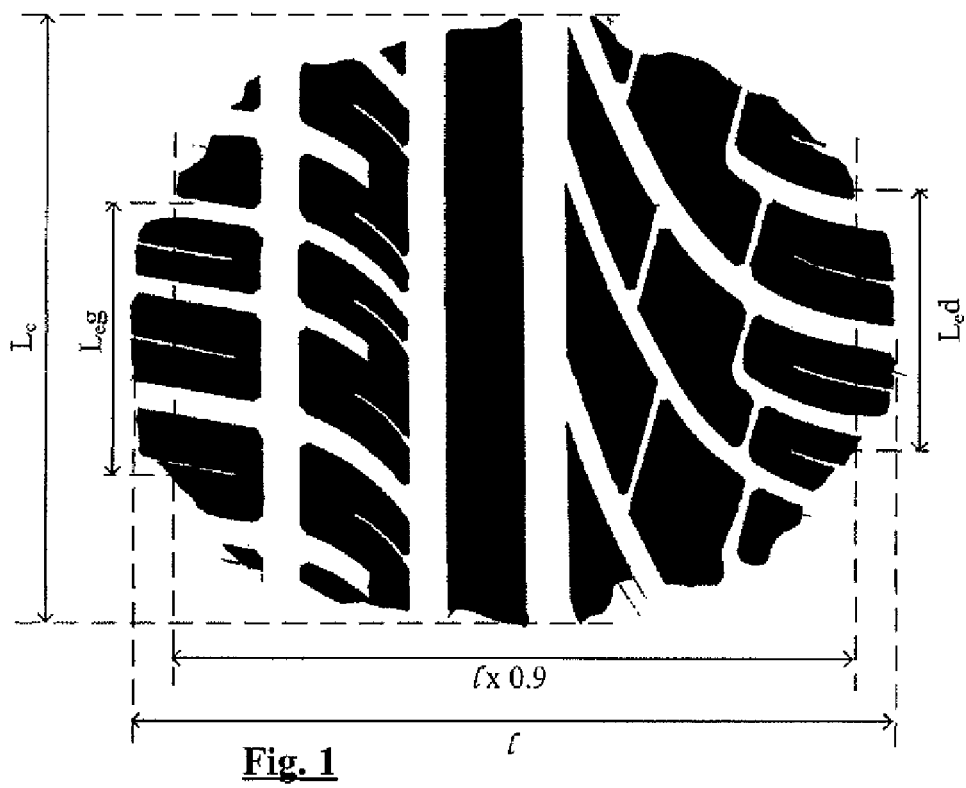
FIG. 1 depicts the contact patch of a tire for a passenger vehicle according to the prior art.

FIG. 1 depicts the contact patch on the ground of a passenger car tire according to the state of the art. The tire in this case is of the type Michelin Primacy 245/50 R 18 100 W as approved by the manufacturer for the vehicle BMW 745i (E65), year model 2002. This tire is referred to as the "reference tire" or "tire A" in the rest of the application. The contact patch is the image of the zones of contact between the tire and the ground in the area of contact. A person skilled in the art of the tire often employs the expressions "area of contact" and "contact patch" in an interchangeable manner in practice.

The contact patch is determined when the tire, inflated to 2.5 bar, maintained in a vertical position on a horizontal surface (that is to say with zero camber) and supporting a load equivalent to 80% of its rated load index, is rolling in a straight line at a very reduced speed (lower than 3 km/h).

The contact patch ratio "$R_e p$", to which reference is made in the present application, corresponds to the ratio between the length of the contact patch at the shoulder and its length at the centre. For convenience, the maximum length of the contact patch is regarded in the present application as being the central length "$L_c$". The contact patch has a width "1". The lengths "$L_e g$" at the left shoulder and "$L_e d$" at the right shoulder are measured at a distance from the lateral extremities of the contact patch corresponding to 5% of the width of the contact patch. The contact patch ratio is then calculated according to the following formula:

$$R_{ep} = \frac{L_e g + L_e d}{2 \times L_c}$$

In order to determine said lengths, it may be necessary to find the average of a sufficient number (for example 10) of measurements of successive contact patches taken at different azimuths of the tire in order to eliminate the effect of the variations brought about by the tread pattern. The tires for passenger vehicles according to the state of the art generally have a contact patch ratio lower than 0.5.

One way of determining the contact patch of a tire is to photograph the contact area through transparent paving, on which the tire rolls under the conditions described above. The resulting image may be processed automatically with the help of image processing software in order to extract the characteristic dimensions of the contact patch.

Another way of determining the contact patch of a tire is to utilize a sensor of the kind available from the company Tekscan Inc., 307 West First Street, South Boston Mass. 02127-1309, USA and marketed under the name of Tirescan™, model 8050. This type of sensor replaces the transparent paving in the method described below and provides the distribution of pressure in the area of contact. The zones in which the pressure is greater than zero define the contact patch of the tire.

For the reference tire, the load index of 100 corresponds to a load of 800 kg (80% of this load thus represents 640 kg). The tire, of which a contact patch is visible in FIG. 1, thus has a central length of 152.5 mm and shoulder lengths of 73 mm and 72 mm. However, the contact patch ratio is 0.475 for this reference tire.

Figure 2:
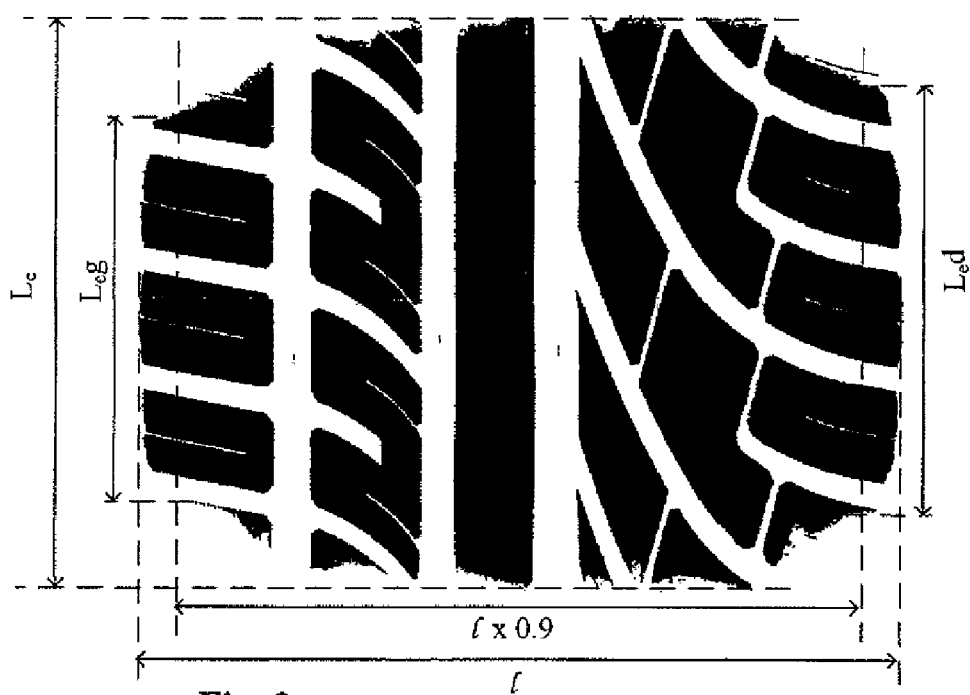
FIG. 2 depicts the contact patch of a tire for a passenger vehicle according to an embodiment of the invention.

FIG. 2 shows a contact patch of a tire according to the invention on the ground. The dimension (245/50 R 18 100 W) and the tread pattern of this tire are identical to those of the reference tire, although its contact patch is different. The central length is reduced ($L_c$=146 mm), and the shoulder lengths ($L_e g$=105 mm and $L_e d$=107 mm) are increased in relation to the reference tire. In this embodiment, the contact patch ratio is 0.726.

The performances of the tires according to the invention in essential respects, such as the useful wearing life or effectiveness on a circuit (dry track and wet track), have been measured and compared in an objective manner to those of state-of-the-art tires under conditions that will now be described.

Two different passenger vehicles were used. The first reference vehicle (vehicle 1) is a BMW 745i vehicle, model E65, year model 2002, as sold in Europe.

The second reference vehicle (vehicle 2) is a BMW 745i vehicle, model E65, year model 2002, which differs from reference vehicle 1 only in that it is fitted with suspensions for the control of the camber according to patent applications WO 2004/058521 and WO 2006/002795. The front axle is fitted with the device depicted in FIGS. 8 and 9 of document WO 2006/002795, and the rear axle is fitted with the device depicted in FIGS. 10 and 11 of document WO 2006/002795.

FIGS. 3 and 4 of the present application are graphs showing the average development of the camber of each wheel as a function of the transverse acceleration experienced by the vehicle. The graph in FIG. 3 relates to the front wheels, and the graph in FIG. 4 relates to the rear wheels. The curves plotted as a broken line relate to vehicle 1 (with conventional suspension), and the curves plotted as a solid line relate to vehicle 2 (with positive camber control).

As customary in the automobile field, transverse acceleration (plotted on the x-axis in graphs) is expressed as a number of "g", "g" being the acceleration of gravity (g=9.81 m/s$^2$). By agreement, positive transverse acceleration corresponds to the case in which the acceleration is directed towards the outside of the vehicle, and negative transverse acceleration corresponds to the case in which the acceleration is directed towards the inside of the vehicle. The camber of the wheel relative to the ground is plotted on the y-axis and is expressed in degrees (°).

It can be appreciated from these graphs that the suspension device of vehicle 2 permits the wheels to be inclined towards the inside of the curve. This behaviour can be compared to the behaviour of the conventional vehicle (vehicle 1), for which the wheels are inclined towards the outside of the curves under the effect of rolling and the elasto-cinematic deformations of the suspensions. It can also be appreciated that, for vehicle 2, the camber is substantially zero when the transverse acceleration is zero, that is to say when the vehicle is rolling in a straight line. On the other hand, on vehicle 1, the static set-up of the camber is in the order of +0.5° on the front axle and −1° on the rear axle. If one compares the inclines of the curves for the two vehicles (vehicle 1 and vehicle 2), one will be able to specify clearly what one intends by the expression "positive control of the camber", it being a question of ensuring that the rate of variation of the camber as a function of the transverse acceleration is positive (at least for a central range of transverse acceleration), which amounts to reversing the conventional tendency represented by the behaviour of the vehicle 1.

In the graph in FIG. 3 relating to the front axle, it can be noted that the average rate of variation of the camber as a function of the transverse acceleration is in the order of +6°/g between −0.3 g and 0.3 g for vehicle 2, whereas it is in the order of −5.5°/g for vehicle 1.

In the graph in FIG. 4 relating to the rear axle, it can be noted that the average rate of variation of the camber as a function of the transverse acceleration is in the order of +12.5°/g between −0.3 g and 0.3 g for vehicle 2, whereas it is in the order of −5.5°/g for vehicle 1.

The control of the camber of vehicle 2 is a passive form of control utilizing the transverse forces applied to the wheels through the ground as a result of centrifugal force in order to bring about variations in the camber. An active device may, however, produce a similar effect provided that it is controlled in such a way as to incline the wheels towards the inside of the corners.

One way of creating these graphs for a given vehicle is to measure (in a steady state) the transverse acceleration and to deduce the camber of the wheels relative to the ground on the basis, on the one hand, of optical measurements of the camber of the wheels in relation to the vehicle and, on the other hand, of simultaneous measurements of the rolling of the vehicle.

Three different types of tire were evaluated: the reference tire (tire A) and two tires according to the invention (tire B and tire C).

As has already been seen above (see also FIG. 2), tire B according to a first embodiment of the invention is of the same dimension (245/50 R 18 100 W) as tire A, and its tread is composed of the same material. Tire B has a contact patch ratio of 0.726, that is to say a contact patch ratio greater than 0.65.

A person skilled in the art of passenger car tires will know how to obtain a contact patch ratio greater than that of the state of the art. He may modify the profile of the tire for that purpose, in order to increase the radii of curvature of the tread, for example, by modifying the profile of the curing mould or by modifying the tension, the density or the distribution of the circumferential reinforcements of the belt. By a process of adapting these parameters, or others, a person skilled in the art may obtain a given contact patch ratio, for example greater than 0.65 according to the invention.

Tire C according to a second embodiment of the invention is of the same dimension (245/50 R 18 100 W) as tires A and B, its architecture, its contact patch and its contact patch ratio being identical to those of tire B. Tire C differs from tire B only in respect of the material of its tread.

The tread of tire C and that of tires A and B are both composed of rubber compositions reinforced with silica but with a very different formulation:

Tires A and B utilize a first composition with a base of solution SBR elastomer recognized as offering an excellent compromise between wear resistance and grip, in particular on a wet surface;

Tire C utilizes a second composition, of which the elastomer matrix and the proportion of silica have been notably modified in comparison with the first composition, in such a way as to augment the grip and correspondingly to reduce the wear resistance in a very perceptible manner.

The significant difference in their grip potential on a wet surface has been notably confirmed by the measurement of the dynamic properties of the compositions according to the standard ASTM D 5992-96 using a viscosity analyzer (Metravib VA4000). The response of a sample of vulcanized composition (cylindrical test piece having a thickness of 4 mm and a cross section of 400 mm$^2$), when subjected to a sinusoidal stress in the form of simple alternate shearing, at a frequency of 10 Hz, when exposed to a range of temperatures, at a constant pressure of 0.7 MPa, is recorded in the course of the test. The value of tan δ measured at −10° C. is a recognized indicator of the grip performance on a wet surface: the higher the value of tan(δ)−10° C., the better the grip. Values of 0.78 for the first composition and around 1.00 for the second composition have thus been recorded, which represents a very significant difference for a person skilled in the art.

The tests involved the comparison of five different situations:
vehicle 1 fitted with four tires A,
vehicle 1 fitted with four tires B,
vehicle 2 fitted with four tires A,
vehicle 2 fitted with four tires B,
vehicle 2 fitted with four tires C.

The tests conducted on the useful wearing life correspond to very heavy wear when driven on the road. This very heavy wear corresponds to that which separates the 10% of the most heavy wear from the 90% of the least heavy wear. This reference wear, designated D10, is described in the article published by the Society of Automobile Engineers, Inc. (SAE) under reference number 980256 and entitled "Evaluation of Tire Wear Performance". The results of the tests of the useful wearing life are given here in the form of an index of performance. The index 100 corresponds in these conditions (wear D10) to the useful wearing life of the reference tire (tire A) on the first reference vehicle (vehicle 1). An index greater than 100 corresponds to a higher useful life, and an index of 200 corresponds to double the useful wearing life. Because of the lack of technical relevance of this combination, tire B has not been evaluated for wear on vehicle 1.

The tests on a circuit were conducted on a particularly winding track with the intention of evaluating the ultimate performance of the vehicle, which is an image of the level of grip and the quality of the behaviour. The vehicle is driven at its limit by a professional driver for this purpose, and the average time necessary to complete one lap of the circuit is measured. The lap times achieved with each vehicle and the different tires can then be compared.

For the performance on a dry surface, the circuit used has a length of 2770 m and a width of 8 m. It comprises a road type surface and various curves with gentle banking and radii in the range from 30 to 240 m.

For the performance on a wet surface, the circuit used has a length of 2300 m for a width of 9 m. It comprises various curves with different radii and variable bankings. The watering conditions vary along the length of the circuit in such a way as to simulate as authentically as possible the entire range of conditions encountered on the road network in rainy weather.

In order to facilitate comparisons, the achieved times are expressed as an absolute value for vehicle 1 with tire A and as a relative value in relation to this reference value for the other combinations. A negative relative value corresponds to a shorter time (thus faster), and a positive relative value corresponds to a longer time (thus slower).

The results of these different tests are recorded in the table below:

|  | Vehicle 1, tire A | Vehicle 1, tire B | Vehicle 2, tire A | Vehicle 2, tire B | Vehicle 2, tire C |
|---|---|---|---|---|---|
| Useful wearing life (D10) of the front tire | 100 | not evaluated | 110 | 135 | 100 |
| Useful wearing life (D10) of the rear tire | 100 | not evaluated | 140 | 200 | 120 |
| Dry circuit, lap time | 80.7 sec | −0.29 sec | −0.75 sec | −1.0 sec | −1.78 sec |
| Wet circuit, lap time | 112.7 sec | +0.5 sec | +0.35 sec | −2.4 sec | −7.4 sec |

It will be noted, on reading the results of the tests, that the wear resistance characteristics of tire 13 on vehicle 2 according to the invention are much higher than those of tire A, including when tire A is fitted to vehicle 2. It will also be noted that, although the suspension device for the positive control of the camber of the vehicle 2 itself contributes a significant advantage from the point of view of wear, the contribution made by the invention is quite superior in this area because it extends as far as to double the useful life of the rear tires. It will be further noted that the performance on a circuit is also improved in an appreciable manner on a dry surface (−1 second) and in a spectacular manner on a wet surface (−2.4 seconds). A person skilled in the art of the tire will be aware that gains in this order are very significant gains.

The performances of tire C on a circuit are spectacular, in particular as far as the wet track is concerned (−7.4 seconds), and they are similar to the reference in terms of wear. This illustrates an advantage of the invention, thanks to which it is possible to utilize a tread material with a high grip potential and to obtain considerable gains in pure performance without the wear resistance being degraded in comparison with the reference tire. This represents a considerable advance for a person skilled in the art, who declines to use this type of tire tread on a passenger vehicle because of the unacceptable level of wear.

In fact, the contribution made by the invention may be expressed in different ways. We know that a tire is designed to offer a compromise between different performances in the course of the use for which it is intended. The wear resistance capability permitted by the invention and demonstrated by the tests may thus be "transformed" or "consumed" in the form of other contrasting performances. The tests have permitted the possible transformation of the grip capabilities to be illustrated. It will be appreciated that the gain in wear that is obtained may alternatively be utilized to bring about improvements, in equally spectacular proportions, in other constituent capabilities of the compromise, for example the rolling resistance, the comfort, the external noise or the mass of the tire. It is also possible to apportion the gain in an essentially equal manner across several areas of performance, for example by choosing to combine substantial improvements in grip on a wet surface, rolling resistance and mass (without substantial progress on the plane of wear). All of these combinations are, in fact, conceivable.

In order to derive the best possible advantage from the tires according to the invention, the suspension device for controlling the camber of the vehicle according to the invention is configured in such a way that the average rate of variation in the camber as a function of the transverse acceleration is preferably greater than 5°/g, and more preferably greater than 10°/g, between −0.3 g and 0.3 g of transverse acceleration.

Moreover, a supplementary advantage of the tire according to the invention in relation to a tire according to the state of the art is that the amplitude of the movements in the camber that it necessitates is lower, which permits a reduction in the volume occupied by the wheels and by the suspension devices required for the positive control of the camber.

The invention claimed is:

1. A tire for an axle of a private passenger vehicle having two axles, said axle comprising a suspension device for positively controlling the camber of the wheels relative to the ground in the case of transverse acceleration, said tire developing a contact patch on the ground, said contact patch having a length at the left shoulder ($L_e g$), a length at the right shoulder ($L_e d$) and a central length ($L_c$), a contact patch ratio ($R_{ep}$) being defined by the quotient of the average of the shoulder lengths divided by the central length, wherein the contact patch ratio is greater than 0.65.

2. The tire according to claim 1, wherein the contact patch ratio ($R_{ep}$) is greater than 0.70.

3. The tire according to claim 1, wherein the tread is composed of a rubber composition of which the value of tan δ measured at −10° C. is greater than 0.85.

4. The tire according to claim 3, the value of tan δ measured at −10° C. being greater than 0.90.

5. A private passenger vehicle having two axles, at least one of the two axles comprises a suspension device for positively controlling any variations in the camber of the wheels relative to the ground in the case of transverse acceleration, said at least one axle being fitted with tires according to claim 1.

6. A private passenger vehicle having two axles, wherein at least one of the two axles comprises a suspension device for positively controlling any variations in the camber of the wheels relative to the ground in the case of transverse acceleration, wherein each of the two axles comprises a suspension device for positively controlling any variations in the camber of the wheels relative to the ground in case of transverse acceleration, the two axles being fitted with tires according to claim 1.

7. The vehicle according to claim 6, wherein said suspension device is a passive system.

8. The vehicle according to claim 5, wherein the suspension device is configured in such a way that the vehicle presents an average rate of variation of the camber as a function of the transverse acceleration greater than 5°/g between −0.3 g and 0.3 g of transverse acceleration.

9. The vehicle according to claim 8, wherein the average rate of variation of the camber as a function of the transverse acceleration is greater than 10°/g between −0.3 g and 0.3 g of transverse acceleration.

* * * * *